United States Patent

[11] 3,582,094

| [72] | Inventor | Robert L. Whittaker |
| | | North Wales, Pa. |
| [21] | Appl. No. | 11,497 |
| [22] | Filed | Feb. 16, 1970 |
| [45] | Patented | June 1, 1971 |
| [73] | Assignee | Greene, Tweed & Co., Inc. |
| | | North Wales, Pa. |
| | | Continuation-in-part of application Ser. No. 662,182, Aug. 21, 1967, now abandoned. |

[54] SEALING ASSEMBLY
8 Claims, 6 Drawing Figs.

[52] U.S. Cl. ................................................... 277/188, 277/177
[51] Int. Cl. ..................................................... F16j 15/00, F16l 21/02
[50] Field of Search............................................ 277/188, 165, 190, 177, 176

[56] References Cited
UNITED STATES PATENTS

| 2,459,642 | 1/1949 | Hamilton et al. | 277/188X |
| 2,765,204 | 10/1956 | Josephson | 277/188 |
| 3,287,022 | 11/1966 | Soechting | 277/188 |
| 3,300,225 | 1/1967 | Shepler | 277/188 |

*Primary Examiner*—Samuel B. Rothberg
*Attorney*—Seidel, Gonda & Goldhammer

ABSTRACT: The disclosure herein describes a modified T-shaped or L-shaped ring assembly. The assembly contains an extrudable, resilient member having a T-cross-sectional shape or an L-crpss-sectional shape, where the vertical portion of the T separates and is adjacent to at least two nonextrusion rings or the upright portion of the L is adjacent at least one nonextrusion ring. The nonextrusion rings and the adjacent resilient member are mutually shaped in a complementary manner so that the corner portion of each nonextrusion ring adjacent to the corner portion of the resilient member match each other but do not form right angle corners.

PATENTED JUN 1 1971

INVENTOR
ROBERT L. WHITTAKER

ATTORNEYS

PATENTED JUN 1 1971

INVENTOR
ROBERT L. WHITTAKER

BY
Seidel, Gonda & Goldhammer
ATTORNEYS.

SEALING ASSEMBLY

This application is a continuation-in-part of application Ser. No. 662,182, filed Aug. 21, 1967, and now abandoned.

This invention relates to a sealing element and more particularly to a sealing element having a resilient member of a T-shaped or L-shaped cross section together with at least one matching relatively nonresilient nonextrusion ring located adjacent the vertical section of the T or L.

The invention generally contemplates a sealing arrangement wherein an apparatus comprising first and second means at least one of which is movable relative to the other in a predetermined direction, require sealing. Such apparatus elements are preferably operatively associated in relatively displaceable relationship and include both rod and piston-type seals.

The T-shaped seal utilizing nonextrudable materials on either side of the vertical portion of the T has found wide acceptance. Such sealing elements are particularly useful in the replacement of conventional O-rings. In part, the popularity of such an element is due to the fact that the resilient material is not extensively extruded into the clearance between the movable elements of an apparatus. Such an arrangement does provide proper sealing by the urging of the nonextrudable or antiextrusion elements into extrusion preventing relationship. In use, such assemblies have provided excellent service due to resistance to destructive deformation. Such assemblies will not spiral, wedge into clearances, or pinch off under motion or pressure. In particular, such T-ring assemblies have proven superior in high-pressure applications. Under zero or low pressure, the vertical portion of the resilient T-shaped ring will provide the sealing function. At higher pressures, the deformation of the resilient member will urge the nonresilient, nonextrusion material into the proper positions for sealing contact by preventing extrusion of the resilient member into the clearance between the sealing assembly and the wall.

An L-shaped ring assembly will perform a sealing function in much the same manner as the T-ring assembly described hereinbefore. Typically an L-shaped ring assembly will be provided with at least one nonextrusion ring adjacent the upright portion of the L-shape. Split rings of similar or different nonextrusion materials can be used with either T- or L-shaped resilient rings.

Under severe conditions the antiextrusion rings may wear rapidly, thereby reducing its radial width. The radial clearance between the antiextrusion ring and the flange of the resilient sealing member is thus increased. Then, much more material of the resilient sealing member flow into the enlarged space. This material must travel further and is extruded into this space to such an extent that it is torn loose from the resilient sealing member. Also, in this stretched condition, it is easily torn, abraded, and cut by the sharp corner of the antiextrusion ring. As this action is repeated with each cycle of application and removal of pressure, small bits of rubber are continually removed until a channel is formed in the resilient sealing member. This channel continues to enlarge and eventually causes seal failure.

It is therefore an object of this invention to provide a modified sealing assembly whereby the aforementioned pitting is substantially reduced.

It is a further object of this invention to provide a novel T-shaped resilient ring for use with matching nonextrusion rings to provide longer wear from a sealing assembly formed therefrom.

It is further object of this invention to provide a novel L-shaped resilient ring for use with at least one nonextrusion ring, where both rings are matched to provide longer wearing characteristics from the sealing assembly formed therefrom.

The above and further objects and advantages of the present invention will become apparent from the hereinafter contained description of the present invention.

For the purpose of illustrating the invention there is shown in the drawings a form which is presently preferred; it being understood, however, that this invention is not limited to the precise arrangements or instrumentalities shown.

Figure 1:
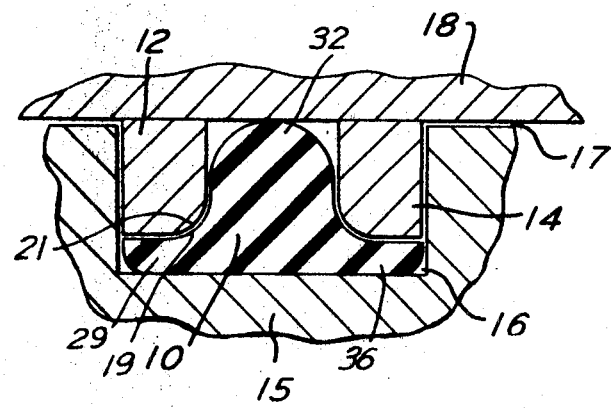
FIG. 1 is a fragmentary cross-sectional view of a T-ring seal according to the invention.

Referring now to the drawings in detail, wherein like numerals indicate like elements, FIG. 1 shows a resilient T-shaped ring 10 bracketed by nonextrudable, nonresilient rings 12 and 14. The assembly shown is disposed in groove 16 within element 15 which may be a piston rod or the like. Wall 18 may be considered to be a cylinder wall or the like. The components of the T-ring seal shown in FIG. 1 are illustrated in the zero or low-pressure condition, or convenience of illustration. The corners of the rings 12 and 14 that are adjacent to the upright or radially outwardly extending leg portion 32 of T-shaped ring 10 are shown with matching radiuses. A clearance between these radiuses is shown only for purpose of illustration. Portions of the leg 32 remote from the corners are, however, recessed from the rings 12, 14 to provide for deformation under load.

Figure 2:
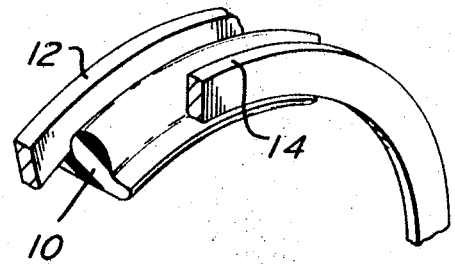
FIG. 2 is a fragmentary perspective view of the T-ring seal of FIG. 1.

FIG. 2 shows the relationship of the component parts of the sealing assembly illustrated in FIG. 1. Circular rings 12 and 14 are shown in their operative positions adjacent the rounded upright portions of the circular inverted T-shaped resilient member. The outer peripheral surfaces of rings 12 and 14 are preferably flat for engagement with a wall or other machine element against which sealing is desired. Under pressure, the rings 12 and 14 will be urged against the wall 18 sealing off the clearance 17 between the wall 18 and the groove containing element 15, thus preventing extrusion of the leg 32 of T-shaped ring 10 into the clearance. With the configuration illustrated, pressure in either direction as well as reciprocating motion of wall 18 or groove containing element 15 relative to the other will not disturb the seal formed. Transition portions in the form of matching radiuses 19, 21 on resilient member 10 and nonresilient rings 12 and 14 provide for a distribution of the force supplied by member 10 against either rings 12 and 14 when member 10 is deformed by the application of pressure in the clearance 17. For the reason more fully set forth below, resilient member 10 is not prone to develop the kind of pitting or tearing which can occur when rings 12 and 14 and resilient member 10 are provided with matching right angle corners or sharp corners as described hereinbefore.

Figure 3:
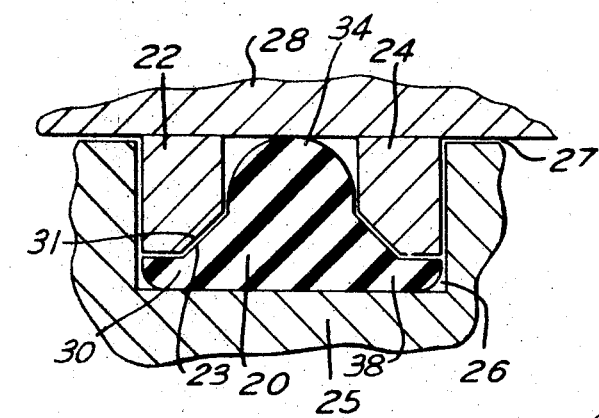
FIG. 3 is a fragmentary cross-sectional view of a modified T-ring seal according to this invention.
Figure 4:
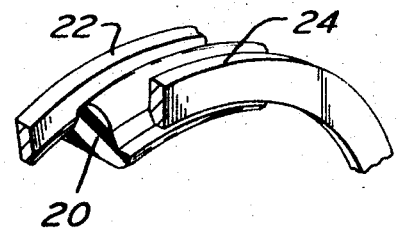
FIG. 4 is a fragmentary perspective view of the T-ring seal of FIG. 3.

The modification of the sealing assembly shown in FIGS. 3 and 4 is accomplished by providing resilient member 20 and rings 22 and 24 with matching beveled surfaces 23, 31. FIG. 3 clearly shows how the elements are matched in the configuration for use. The beveled surfaces 23, 31 can be formed from matching oblique angles taken perpendicularly from the vertical portion of member 20 and the adjacent horizontal portion respectively. The rings 22 and 24 as shown in FIG. 3 continue to provide a flat sealing surface on their outer periphery for providing good antiextrusion contact between the rings 22 and 24 and the wall 28, thereby completely closing the clearance 27. No modification of the groove containing member 25 or groove 26 is necessary to accommodate the modified sealing assembly shown. Again, when pressure is applied the resilient member 20 will be deformed and thereby urge rings 22 and 24 into antiextrusion engagement with wall 28. Providing resilient member 20 and rings 22 and 24 with matching beveled surfaces prevents the type of pitting or tearing of the resilient member which can accompany the use of matching right angle or sharp corners as hereinbefore described.

Describing the operation of the present sealing assembly in greater detail, and referring to FIGS. 1 and 3, when fluid pressure is applied to the assembly through the unnumbered clearance at the left of each FIG., the resilient members 10, 20 become deformed. Material is caused to flow from the legs 29, 30 to the radially extending legs 32, 34 and from the radially extending legs 32, 34 to legs 36, 38 remote from the legs 29, 30. This flowing of material causes the legs 36, 38 to thicken in a radial direction. Thickening of the legs 36, 38 urges the rings 14, 24 into contact with the walls 18, 28 and prevents extrusion of material from the legs 32, 34 into the clearances 17, 27. The application of pressure through the clearances 10, 20, but in an opposite direction.

In the usual installation, the sealing assembly is subjected to a changing force pattern, and undergoes more or less continuous alterations in configuration during operation.

When the material of the resilient members 10, 20 flows to deform, it becomes stressed, the level of the stress being proportional to the distance that the material flows. Increased stress increases the likelihood of damage due to pitting or tearing.

In prior art sealing assemblies, wherein the legs of the resilient members intersect at right angle corners, the distance the material must flow between intersecting legs is great. Thus, the material adjacent the corners is highly stressed, and prone to damage. This condition, coupled with the presence of a sharp edge on the nonextrusion ring in contact with the highly stressed area, has now been found to be the cause of relatively rapid failure of such sealing assemblies.

The present sealing assembly decreases the stress in the resilient members 10, 20, in two ways. First, more material is placed closer to the legs 29, 30 and 36, 38. Through use of the radius 17 and beveled surface 29, referred to generically as faired corner areas, the distance of flow is reduced. Second, sharp edges on the nonextrusion rings 12, 14, 22 and 24 are eliminated.

A typical T-ring assembly with the vertical portion or component of the T extending radially outward has been illustrated for convenience. The sealing assembly of the present invention can likewise by employed with the utility described where the vertical component of the T extends radially inward. Such a configuration employing T-shaped resilient rings with right-angled corners has many known applications.

L-shaped resilient rings and assemblies formed therewith having the vertical portion or component of the L extending either radially outward or radially inward are also well suited for modification according to this invention. Such modified assemblies likewise demonstrate the longer wearing characteristics produced by this invention. Likewise, any resilient sealing ring having a cross-sectional shape which includes at least one horizontal component connected to at least one vertical component to form a corner area which can receive an antiextrusion ring can be adopted for use with the present invention.

The resilient members of the present invention can be formed from any suitable resilient gasketing material, such as neoprene, Buna-S rubber, natural rubber and synthetic elastomeric materials of any description which are useful for the particular type of seal desired. Selection of a suitable material is well within the capabilities of one skilled in the art and would require no exercise of inventive faculty. Preferably, the types of materials employed in conventional O-ring seals will find utility herein.

The nonresilient, nonextrudable rings can be selected from normal nonresilient, nonextrudable materials used in sealing assemblies of the T-ring or L-ring type, including Teflon, phenolic and bronze seals. Selection of appropriate nonextrudable materials, of course, depends upon the application for the sealing assembly. The size and character of the machine elements being sealed, the fluid against which leakage protection is desired, the temperature, pressure, surface finish, speed and direction of motion and other pertinent conditions will dictate the kinds of materials to be employed in the sealing assembly of the present invention. Likewise, split nonextrusion rings can be employed in the sealing assembly according to this invention. In this manner more than one ring can be used in the place of a single ring. Different materials can therefore be used in each of such rings, if desired. For example, if desired, the outboard ring can be selected from hard materials such as bronze and the inboard ring can be selected of a softer material. Preferably the rings should be formed to match on a long bevel so that there is no gap into which the resilient materials can extrude.

Comparative tests have been made with "T-rings" of the prior art design, wherein the legs intersect at right angles, and rings in accordance with this invention, wherein faired corner areas of the radiused design (FIGS. 1 and 2) were used. Operating at the same temperature and pressure, the same length and speed of stroke, and at the same initial rod-bore clearance, the prior art sealing assembly failed after the number 362,000 cycles, while the assembly in accordance with the present invention was removed from the test after the 1,376,000 cycles, without failure. Inspection of the prior art assembly revealed that the sealing ring failed due to "-nibbling," that is, removal of bits of material at the intersections of the legs. No such damage was found in the assembly in accordance with the present invention.

Figure 6:
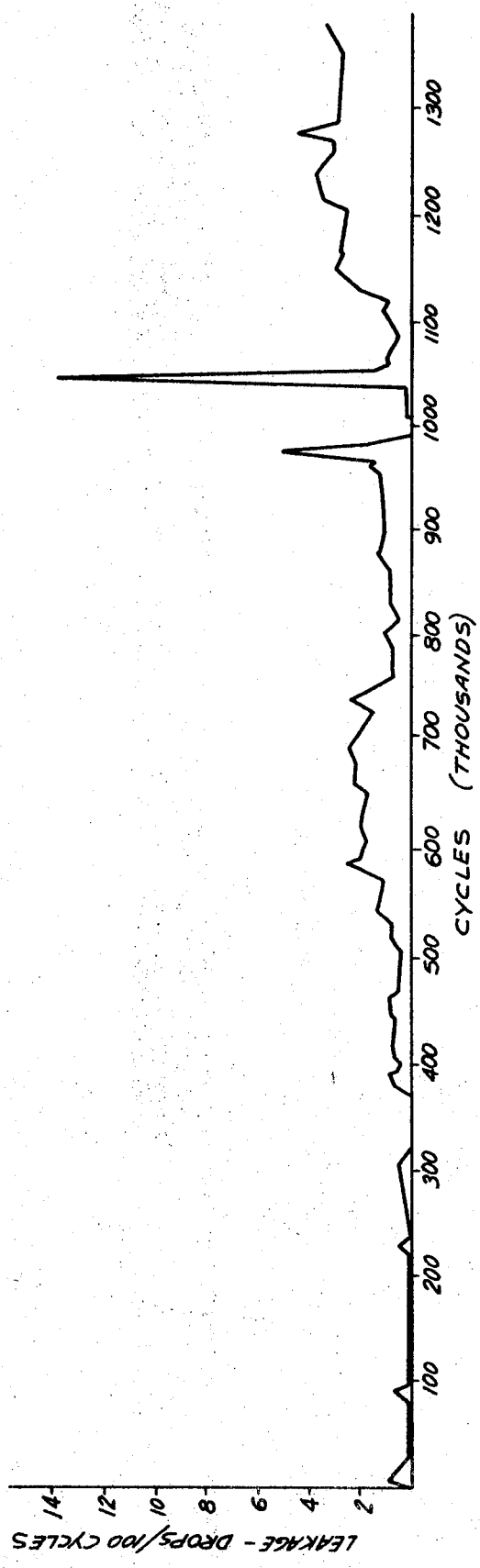
FIG. 6 is a graph similar to FIG. 5, showing leakage as a function of the number of operative cycles for a sealing assembly in accordance with the present invention.
Figure 5:
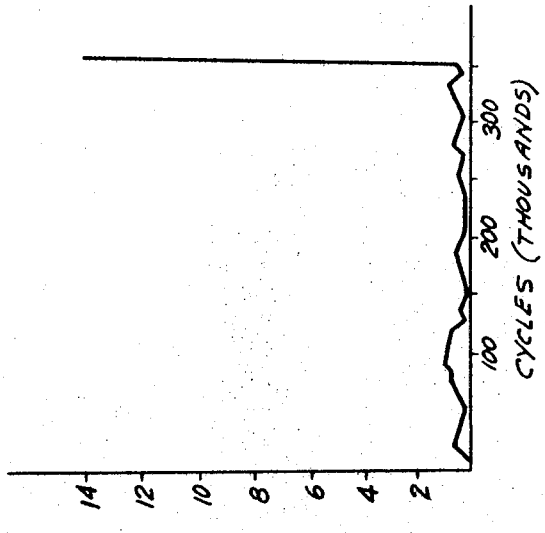
FIG. 5 is a graph showing leakage as a function of the number of operative cycles for a prior art sealing assembly.

FIG. 5 and 6 illustrate the comparative test data for the prior art assembly and the assembly in accordance with the present invention.

The present invention may be embodied in other specific forms without departing from the spirit or essential attributes thereof and, accordingly, reference should be made to the appended claims, rather than to the foregoing specification as indicating the scope of the invention.

I claim:

1. A sealing assembly comprising a resilient circular sealing ring having a cross section including at least one axially extending leg and a radially extending leg intersecting said axially extending leg, a transition portion interconnecting said legs and defining a faired corner area therebetween to permit flow therebetween of material upon deformation of said sealing ring, and at least one nonextrusion ring adapted to the be received in the corner area and extending radially, parallel to said radially extending leg, said nonextrusion ring having a shaped portion complemental with said corner area and said axially extending leg and adapted to mate therewith so that the flow of material between said radially and axially extending legs upon deformation of said sealing ring biases said nonextrusion ring radially outwardly, and said radially extending leg having an end portion thereof remote from said axially extending leg recessed from said nonextrusion ring when said sealing ring is undeformed.

2. A sealing assembly in accordance with claim 1 wherein said transition portion of said sealing ring is a continuous radius extending inwardly from said radially extending leg to said axially extending leg, said nonextrusion ring is radiused outwardly to form a radius complemental with the radius of the sealing ring.

3. A sealing assembly in accordance with claim 1 wherein said transition portion of said sealing ring comprises a flat oblique surface intersecting respective radially and axially extending surfaces of said radially extending and axially extending legs at obtuse angles, and said nonextrusion ring is complementally shaped at said shaped portion.

4. A sealing assembly in accordance with claim 1 wherein said axially and radially extending legs define a generally T-shaped cross section for said sealing ring with the radially extending and axially extending legs interconnected by transition portions, said transition portions being continuous radii extending inwardly from said radial leg to an axial leg, each of said transition portions being adapted to receive a nonextrusion ring having a portion thereof radiused outwardly to form a radius complemental with the radius of one of the transition portions, said end of said radially extending leg being recessed from each of said nonextrusion rings.

5. A sealing assembly in accordance with claim 1 wherein said axially and radially extending legs define a generally T- shaped cross section for said sealing ring with the radially extending and axially extending legs interconnected by transition portions, said transition portions comprising flat oblique surfaces interconnecting respective radially and axially extending surfaces of said radially extending and axially extending legs at obtuse angles, each of said transition portions adapted to receive a nonextrusion ring having a portion complemental therewith, said end of said radially extending leg being recessed from each of said nonextrusion rings.

6. Apparatus comprising elements operatively associated in relative axially displaceable relationship, one of said elements being provided with a radially extending groove opening toward the other of said elements, a sealing assembly in said groove, said sealing assembly comprising a resilient sealing ring having a cross section including at least one axially extending leg and a radially extending leg intersecting said axially extending leg, a transition portion interconnecting said leg and defining a faired corner area therebetween to permit flow of material upon deformation of said sealing ring, at least one nonextrusion ring received in the corner area of said sealing ring and extending parallel to said radially extending leg in contact with one wall of said groove, said nonextrusion ring having a shaped portion complemental with said corner area and said axially extending leg and adapted to mate therewith so that the flow of material between said radially and axially extending legs upon deformation of said sealing ring biases said nonextrusion ring radially outwardly, said radially extending leg having and end portion thereof extending at all times into sealing contact with the other opposite element, said end portion being recessed from said nonextrusion ring when said sealing ring is undeformed.

7. Apparatus in accordance with claim 6, wherein said axially and radially extending legs define a generally T-shaped cross section for said sealing ring with the radially extending and axially extending legs interconnected by transition portions, said transition portions being continuous radii extending inwardly from said radial leg to an axial leg, each of said transition portions receiving a nonextrusion ring having a portion thereof radiused outwardly to form radii complemental with the radii of the transition portions, said end portion of said radially extending leg being recessed from both of said nonextrusion rings when said sealing rings is undeformed.

8. Apparatus in accordance with claim 6 wherein said axially and radially extending legs define a generally T-shaped cross section for said sealing ring with the radially and axially extending legs interconnected by transition portions, said transition portions comprising flat oblique surfaces interconnecting respective radially and axially extending surfaces of said radially and axially extending legs at obtuse angles, each of said transition portions receiving a nonextrusion ring having a portion thereof complemental therewith, and said end portion of said radially extending leg being recessed from both of said nonextrusion rings when said sealing ring is deformed.